United States Patent
Overbeck

(10) Patent No.: US 9,384,595 B2
(45) Date of Patent: Jul. 5, 2016

(54) COMPUTING DEVICES AND METHODS FOR NAVIGATING AROUND A SURFACE OF THREE-DIMENSIONAL (3D) COORDINATE SYSTEM REPRESENTATIONS OF 3D OBJECTS

(71) Applicant: GOOGLE INC., Mountain View, CA (US)

(72) Inventor: Ryan S. Overbeck, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 254 days.

(21) Appl. No.: 13/895,079

(22) Filed: May 15, 2013

(65) Prior Publication Data

US 2015/0187120 A1 Jul. 2, 2015

(51) Int. Cl.
*G06T 19/20* (2011.01)

(52) U.S. Cl.
CPC ......... *G06T 19/20* (2013.01); *G06T 2219/2016* (2013.01)

(58) Field of Classification Search
None
See application file for complete search history.

(56) References Cited

U.S. PATENT DOCUMENTS

2007/0206030 A1* 9/2007 Lukis ............................ 345/653

OTHER PUBLICATIONS

Suarez, Jose P., et al. "An open source virtual globe framework for iOS, Android and WebGL compliant browser." Proceedings of the 3rd International Conference on Computing for Geospatial Research and Applications. ACM, 2012.*
Vince, John. Geometry for computer graphics: formulae, examples and proofs. Springer Science & Business Media, 2006.*

* cited by examiner

*Primary Examiner* — Kee M Tung
*Assistant Examiner* — Ryan M Gray
(74) *Attorney, Agent, or Firm* — Marshall, Gerstein & Borun LLP

(57) ABSTRACT

The present disclosure relates to navigating around geographic maps within a map viewport display. More specifically, the present disclosure relates to navigating around a surface of a 3D, geographic coordinate system, representation of a globe using a pan feature while North is locked. In response to a user activating a pan feature of a navigation interface, a spin angle and, or a swing angle is calculated and the globe is revolved around a spin-axis and, or a swing-axis while revolution around a rotate-axis is locked.

18 Claims, 10 Drawing Sheets

COMPUTING DEVICES AND METHODS FOR NAVIGATING AROUND A SURFACE OF THREE-DIMENSIONAL (3D) COORDINATE SYSTEM REPRESENTATIONS OF 3D OBJECTS

FIELD OF THE INVENTION

The present disclosure relates to navigating around geographic maps presented within a map viewport display to a user of a mapping application. More specifically, the present disclosure relates to navigating around a surface of a three dimensional (3D), geographic coordinate system, representation of the globe using a pan feature while North is locked.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Geographic mapping applications represent some of the most frequently used computer-based applications. The underlying geographic maps often include various features, such as buildings, properties and landmarks in addition to roadways. After launching a mapping application, a navigation interface is used to display a desired view of the associated geographic map within a map viewport.

Navigating around a surface of a three-dimensional, geographic coordinate system, representation of a geographic map of the surface of the Earth presents a plethora of challenges. It is desirable to consistently reposition the geographic map in response to a user activating a navigation interface such that a user is presented with a smooth and predictable transition when moving from a first view to a second view.

SUMMARY

The disclosed systems and methods compute various geometric values associated with visually rotating a three-dimensional (3D) object within a two-dimensional (2D) display. The computations may be in response to a user activating a panning function, for example. In particular, a spin-angle is computed associated with rotating the 3D object around a generally vertical axis, a swing-angle is computed associated with rotating the 3D object around a generally horizontal axis. Both, the spin-angle and the swing-angle may be derived by computing a cross-product using a first vector associated with a starting point and a second vector associated with an ending point.

A method of presenting a camera viewpoint of a three-dimensional surface of a body within a two-dimensional map viewport is provided. The display is rendered on a computing device and the body surface is defined by data of a three-dimensional coordinate system having x, y, and z axes. The body includes a North pole and a South pole, a spin-axis that extends through a center of the body generally along the z-axis, and a swing-axis that extends generally along the x-axis through the center of the body perpendicular to the spin-axis and parallel to a plane defined by the viewport. The method includes rendering a display of the body in the viewport using the three-dimensional coordinate system data and causing the rendered body to move within the viewport between a current point ($\vec{p_0}$) on the body surface and a desired point ($\vec{p_t}$) on the body surface using the three-dimensional coordinate system data. Causing the rendered body to move includes determining a spin-axis angle of revolution around the spin-axis and a swing-angle of revolution around the swing-axis between the current point and the desired point and moving the rendered body within the viewport along the determined spin-axis angle of revolution and the determined swing-axis angle of revolution. Movement of the body within the viewport between the current point and the desired point does not change an orientation of the North pole of the rendered body within the viewport.

In another embodiment, a computing device having a display configured to present a camera viewpoint of a three-dimensional surface of a body within a two-dimensional viewport is provided. The body surface is rendered on a computing device and the body surface is defined by data of a three-dimensional coordinate system having x, y, and z axes. The body includes a North pole and a South pole, a spin-axis that extends through a center of the body generally along the z-axis, and a swing-axis that extends generally along the x-axis through the center of the body perpendicular to the spin-axis and parallel to a plane defined by the viewport. The computing device includes a cursor control device having a user input mechanism. Activation of the cursor control device and the input mechanism causes a processor to execute a body surface panning module and a display generation module stored on a non-transitory computer readable medium that, when executed by a processor, renders a display of the body in the viewport using the three-dimensional coordinate system data. The body surface panning module stored on a non-transitory computer readable medium that, when executed by a processor, causes the rendered body to move within the viewport between a current point ($\vec{p_0}$) on the body surface and a desired point ($\vec{p_t}$) on the body surface using the three-dimensional coordinate system data. The rendered body moves in response to determining a spin-axis angle of revolution around the spin-axis and a swing-angle of revolution around the swing-axis between the current point and the desired point and moving the rendered body within the viewport along the determined spin-axis angle of revolution and the determined swing-axis angle of revolution. Movement of the body within the viewport between the current point and the desired point does not change an orientation of the North pole of the rendered body within the viewport.

In a further embodiment, a non-transitory computer-readable medium having instructions stored thereon that are configured to present a camera viewpoint of a three-dimensional surface of a body within a two-dimensional viewport is provided. The body surface is rendered on a computing device and the body surface includes data of a three-dimensional coordinate system having x, y, and z axes. The body includes a North pole and a South pole, a spin-axis that extends through a center of the body along the z-axis between the North pole and the South pole, and a swing-axis that extends along the x-axis through the center of the body perpendicular to the spin-axis and parallel to a plane defined by the viewport. The non-transitory computer-readable medium includes a display generation module that, when executed by a processor, renders a display of the body in the viewport using the three-dimensional coordinate system data, a body surface panning feature module that, when executed by a processor, causes the rendered body to move within the viewport between a current point ($\vec{p_0}$) on the body surface and a desired point ($\vec{p}_t$) on the body surface using the three-dimensional coordinate system data. The body is moved by determining a spin-axis angle of revolution around the spin-axis and a swing-angle of revolution around the swing-axis between the current point and the desired point and moving the rendered body within the viewport along the determined spin-axis angle of revolution and the determined swing-axis angle of revolution. Movement of the body within the viewport between the current point and the desired point does not change an orientation of the North pole of the rendered body within the viewport.

The features and advantages described in this summary and the following detailed description are not all-inclusive. Many additional features and advantages will be apparent to one of ordinary skill in the art in view of the drawings, specification, and claims hereof.

DETAILED DESCRIPTION

Geographic maps based on a two-dimensional (2D) Mercator projection, of the surface of the Earth are widely available. When a 2D Mercator projection of the surface of the Earth is displayed within a map viewport of a computing device, navigation around the map is easily accomplished using a pan function. A pan function may be included within the map viewport by providing, for example, an up-arrow, a down-arrow, a left-arrow and a right-arrow user interface for panning functions. When a user selects any one of the arrows using a cursor control device (e.g., a mouse), the map will move in a corresponding direction within the map viewport. Alternatively, a pan feature may be provided in which the user places the cursor over a first point within the geographic map, selects the first point, and then drags the first point from an original location to a second location. In any event, activation of the pan function within a 2D Mercator projection map of the surface of the Earth does not rotate a globe. In a 2D context, the North-South and East-West orientation of the map remains fixed within the map viewport when the pan function of a navigation interface is activated. In a 3D context, a user can purposefully reorient the North-South and East-West orientation of the map by activating a rotate function of a navigation interface.

Figure 1:
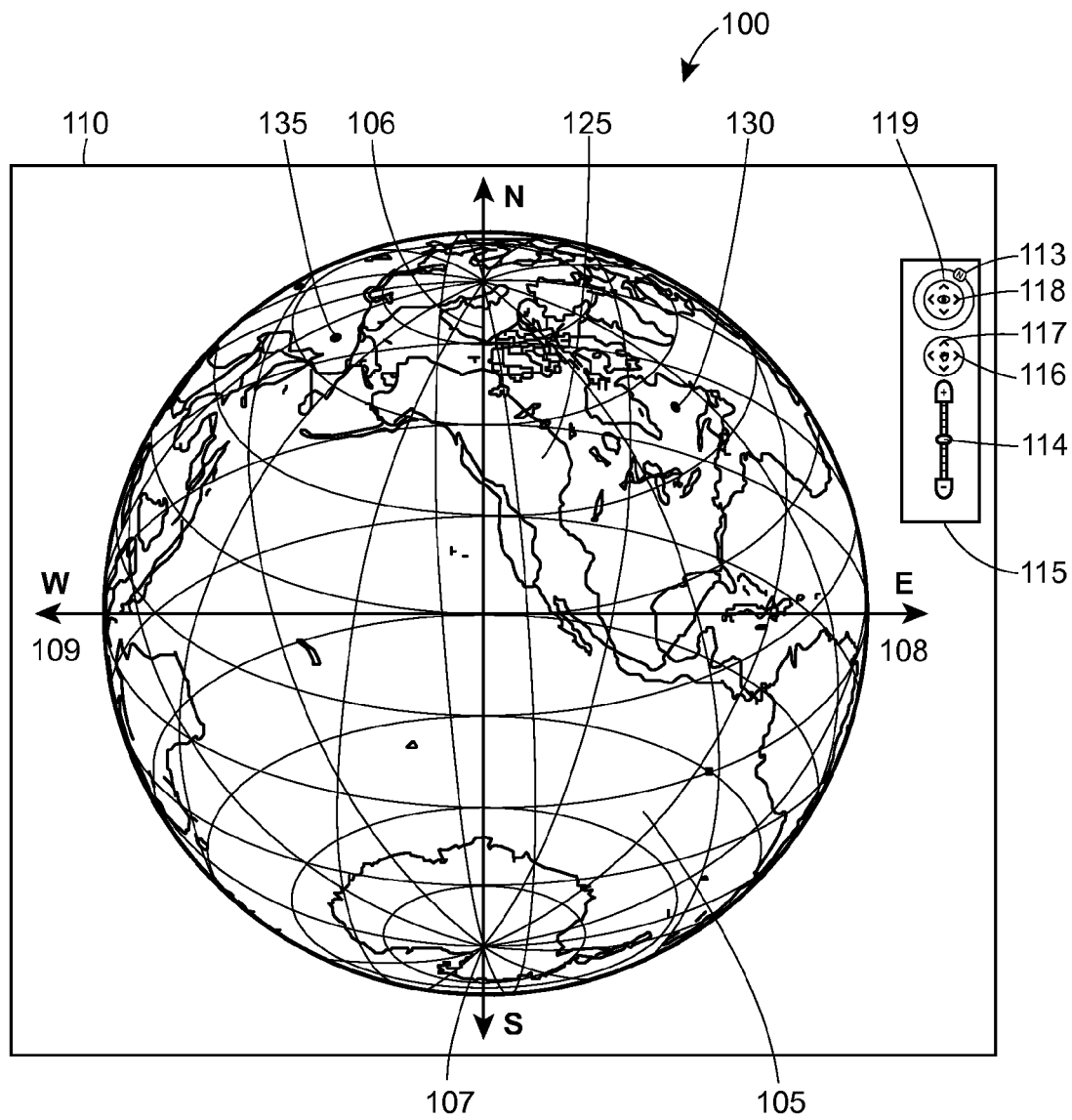
FIG. 1 depicts a camera view of a 3D, geographic coordinate system, representation of a globe within a map viewport along with a navigation interface.

Geographic maps based on a three-dimensional (3D), geographic coordinate system representation of the Earth, as depicted in FIG. 1, are desirable. Navigating around the surface of a 3D, geographic coordinate system representation of the earth using known mapping applications is difficult when compared to navigating around a 2D Mercator projection. In a 3D context, when a user activates a pan function of a corresponding navigation interface, the North-South and East-West orientation (i.e., compass heading) drifts with respect to the original orientation while the map is repositioned from a first view to a second view. Because of this drift, map rotation in response to a user activating a pan function of a navigation interface may be disorienting to the user. Providing navigation within a 3D, geographic coordinate system representation of the Earth that is similar to navigation within a 2D Mercator projection is desirable. As will be described in detail herein, navigation within a 3D, geographic coordinate system representation of the Earth is made similar to navigation within a 2D, Mercator projection of the Earth by locking a compass heading during panning. The compass heading is changed only when the user purposely activates a navigation function (e.g., compass rotation) that is separate from a pan function.

In one embodiment described in detail herein, a spin angle (e.g., spin angle 211a of FIG. 2A) defines a revolution of a globe (e.g., Earth 105 of FIG. 1) around a spin-axis (e.g., spin-axis 210a of FIG. 2A) when a horizontal pan feature (e.g., horizontal pan feature 116 of FIG. 1) is activated. A swing angle (e.g., swing angle 216a of FIG. 2A) defines a revolution of the Earth 105 around a swing-axis (e.g., swing-axis 215a of FIG. 2A) when a vertical pan feature (e.g., vertical pan feature 117 of FIG. 1) is activated. A rotate angle (e.g., rotate angle 221a of FIG. 2A) defines a revolution around a rotate-axis (e.g., rotate-axis 220a of FIG. 2A) when a compass heading feature (e.g., compass heading feature 113 of FIG. 1) is activated. The horizontal pan feature 116, the vertical pan feature 117 and the compass heading feature 113 are associated with a navigation interface (e.g., navigation interface 115 of FIG. 1). Because activation of the horizontal pan feature 116 and/or activation of the vertical pan feature 117 does not activate the compass heading feature 117, revolution of an associated globe (e.g., Earth 105 of FIG. 1) around the rotate-axis 220 remains locked (i.e., a North orientation of the Earth 105 is locked) when a user of a corresponding mapping application navigates between a first point (e.g., first point 130 of FIG. 1) and a second point (e.g., second point 135 of FIG. 1). The same panning functionality (i.e., a North orientation of the Earth 105 is locked while panning) may be provided when a user of a corresponding mapping application activates a "point select and drag" pan feature using a pointing device (e.g., a mouse). In any event, activation of the horizontal pan feature 116 and activation of the vertical pan feature 117 are independent of activation of the compass heading rotate feature 113.

FIG. 1 depicts a display 100 having a 3D, geographic coordinate system representation of the Earth 105 and a navigation interface 115 within a map viewport 110. The Earth 105 includes a North pole 106, a South pole 107, an East hemisphere 108 and a West hemisphere 109. While the North pole 106 is oriented toward the top of the map viewport 110 in FIG. 1, the North pole 106 can be reoriented by a user in any direction relative to the map viewport 110 via a compass rotate feature or function (e.g., first compass rotate feature 113) of the navigation interface 115.

The navigation interface 115 may include a first compass rotation feature 113, a zoom feature 114, a horizontal pan feature 116, a vertical pan feature 117, a second compass rotation feature 118 and a tilt feature 119. In one embodiment, a user may position a cursor (not shown in FIG. 1) over a first point 130 using a cursor control device (e.g., a mouse), activate a user input (e.g., a left mouse button), and drag the first point 130 to a second point 135. Alternatively, a user can activate the horizontal pan feature 116 and, or the vertical pan feature 117 to reposition the first point 130 to the second point 135. In either event, the compass rotation features 113, 118 remain locked while the user pans from the first point 130 to the second point 135.

Figure 2A:
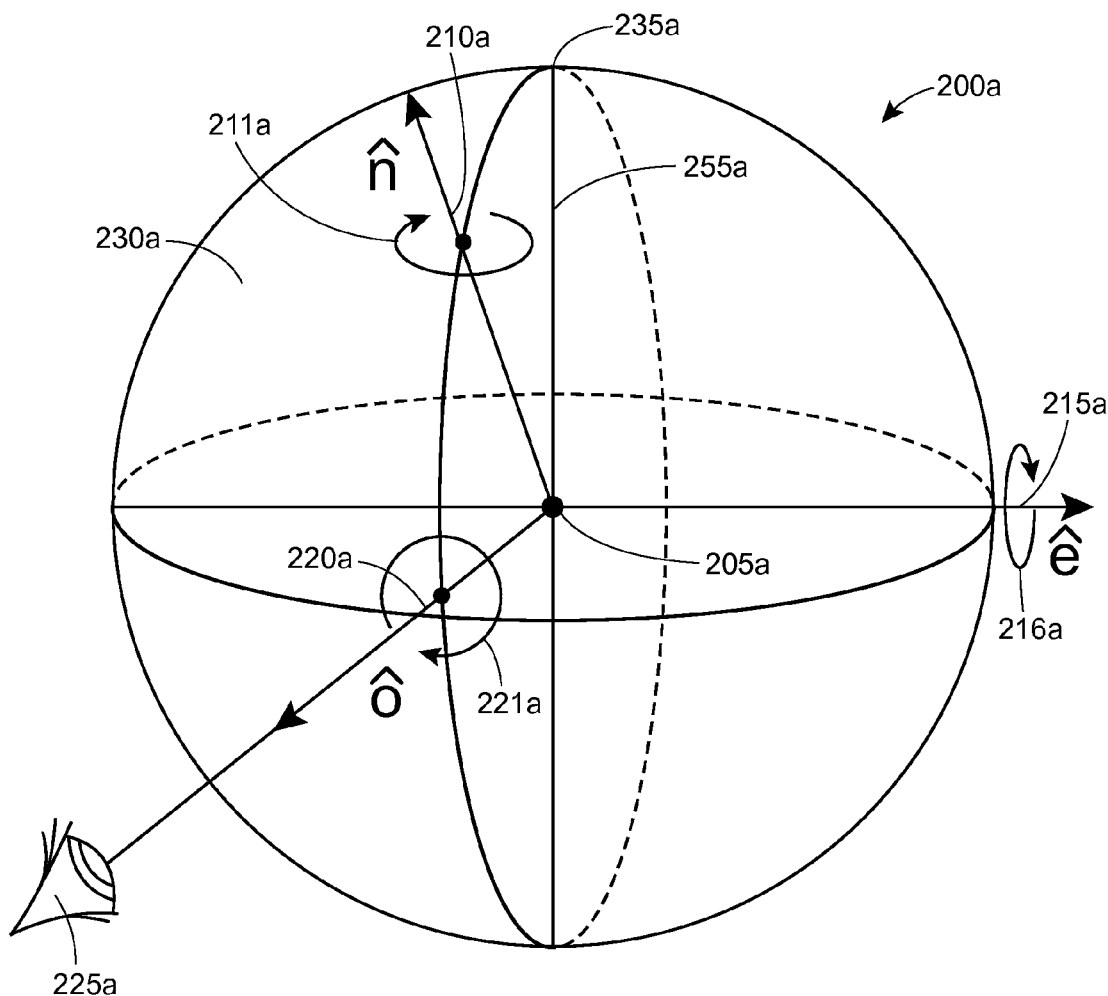
FIGS. 2A-2B depict a sphere used as a geometric representation of the globe of FIG. 1.
Figure 2B:
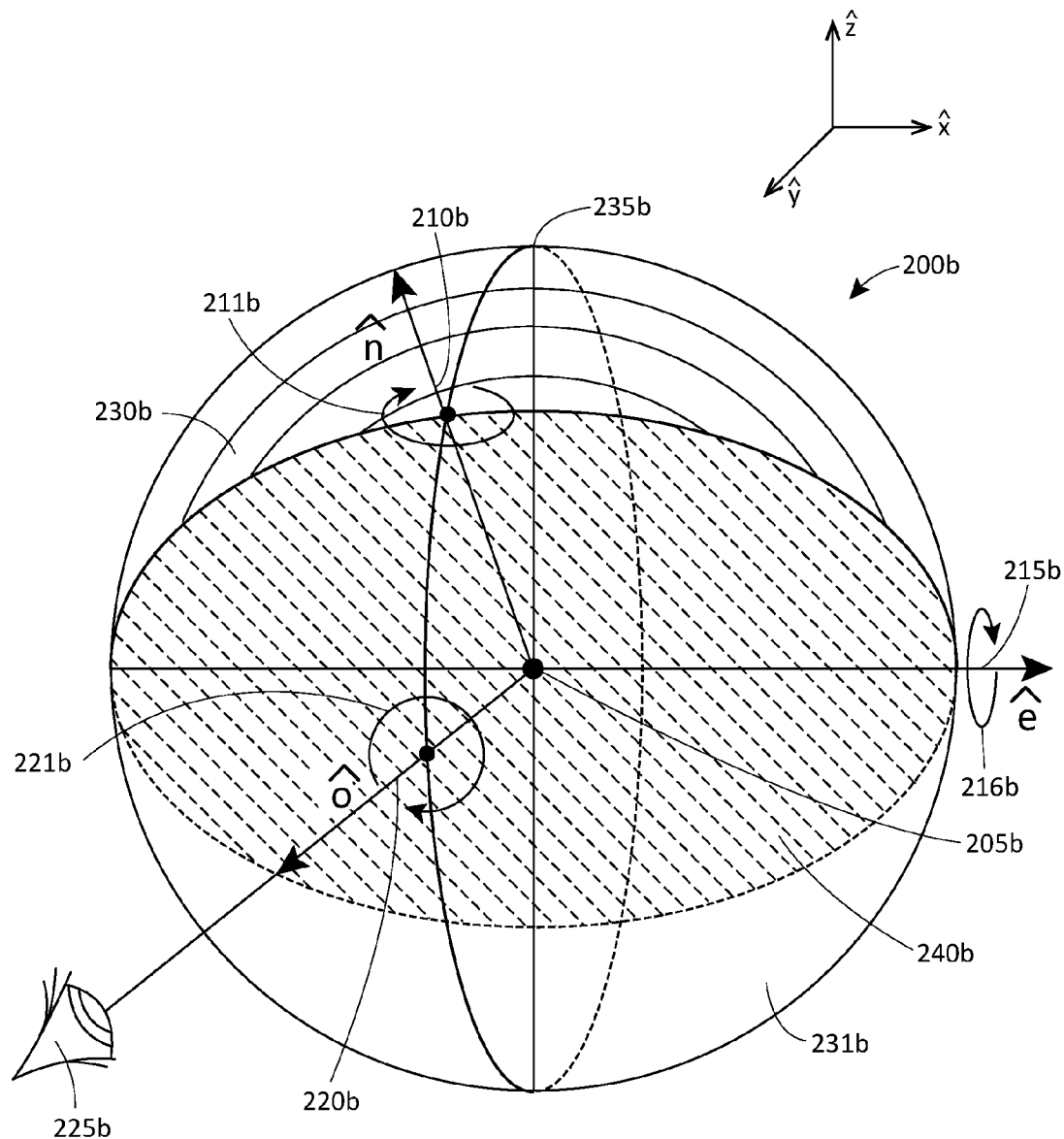

In an effort to simplify the ensuing discussion, the Earth 105 of FIG. 1 will be represented by a sphere 200a, 200b as depicted in FIGS. 2A and 2B. The center of the sphere 205a, 205b may coincide with the center of mass of the Earth 105. The sphere 205a, 205b may include a spin-axis 210a, 210b, a swing-axis 215a, 215b and a rotate-axis 220a, 220b. A camera or observation perspective point 225a, 225b is depicted relative to the sphere 205a, 205b with reference to the rotate-axis 220a, 220a. The camera 225a, 225a is representative of the perspective or viewpoint (e.g., eye point) that a user of a mapping application may have while viewing a geographic map. The camera viewpoint 225a, 225b may also correspond to a point on the surface of the sphere where the rotate axis 220a, 220b intersects the sphere surface before continuing to the camera viewpoint 225a, 225b. The rotate axis 220a, 220b intersects both the sphere surface and the camera viewpoint. As described in detail herein, panning around a surface 230a, 230b of the sphere 200a, 200b will entail revolving the sphere 200a, 200b around the spin-axis 210a, 210b, by a spin angle 211a, 211b, and, or revolving the sphere 200a, 200b around the swing-axis 215a, 215b, by a swing angle 216a, 216b, while keeping revolution of the sphere 200a, 200b around the rotate-axis 220a, 220b locked. Determination of the spin angle 211a, 211b and the swing angle 216a, 216b is described in detail herein. As will become apparent, panning around the surface 230a, 230b of the sphere 200a, 200b in this manner maintains a consistent North pole 235a, 235b orientation of the sphere 200a, 200b. Re-orientation of the North pole 235a, 235b of the sphere 200a, 200b is accomplished by revolving the sphere 200a, 200b around the rotate-axis 220a, 220b, by a rotate angle 221a, 221b, using a compass rotation feature (e.g., either compass rotation feature 113, 118 of FIG. 1). As further depicted in FIG. 2B, the sphere 200b is depicted to have a plane 240b, defined by the spin axis 210b and the swing axis 215b. The plane 240b divides the sphere 200b into a front hemisphere 231b and a rear hemisphere 230b. As described in detail elsewhere herein, when a user navigates from a first point 130 on the front hemisphere 231b to a second point 135 on the rear hemisphere 230b, the sphere may rotate around the spin-axis 210a, 210b in a direction opposite to a direction when both the first point 130 and the second point 135 are within the same hemisphere 230b, 231b. Equations 1-18 compensate for the position of the first point 130 and the second point 135 relative to the front hemisphere 231b and the rear hemisphere 230b and a desired 3D object rotation is achieved no matter which hemisphere 230b, 231b the first point 130 and second point 135 are in.

While the above discussion has generally focused on spherical shaped objects (e.g., a globe and the Earth), the spin angle and swing angle computations described herein may be used in conjunction with display of any 3D objects (i.e., bodies), such as a shoe, a human, a building, a vehicle, etc. In any event, even when the object to be displayed is, itself, not spherically shaped, (x, y, z) coordinates representative of a sphere are used to determine the spin angle and the swing angle as described herein. With respect to non-spherically shaped 3D objects (or "bodies"), the center of mass or barycenter (if the body has uniform density), or the centroid of the non-spherically shaped 3D object may coincide with the same point (e.g., point 205a of FIG. 2A) of a corresponding sphere (e.g., sphere 200a of FIG. 2A) used to determine an associated spin angle and swing angle. A corresponding radius 255a of the sphere 200a that is used to compute a spin angle and swing angle may represent a distance between the body's centroid (e.g., center of mass of the Earth 105 of FIG. 1) to a starting point (e.g., start point 130 of FIG. 1).

Figure 3:
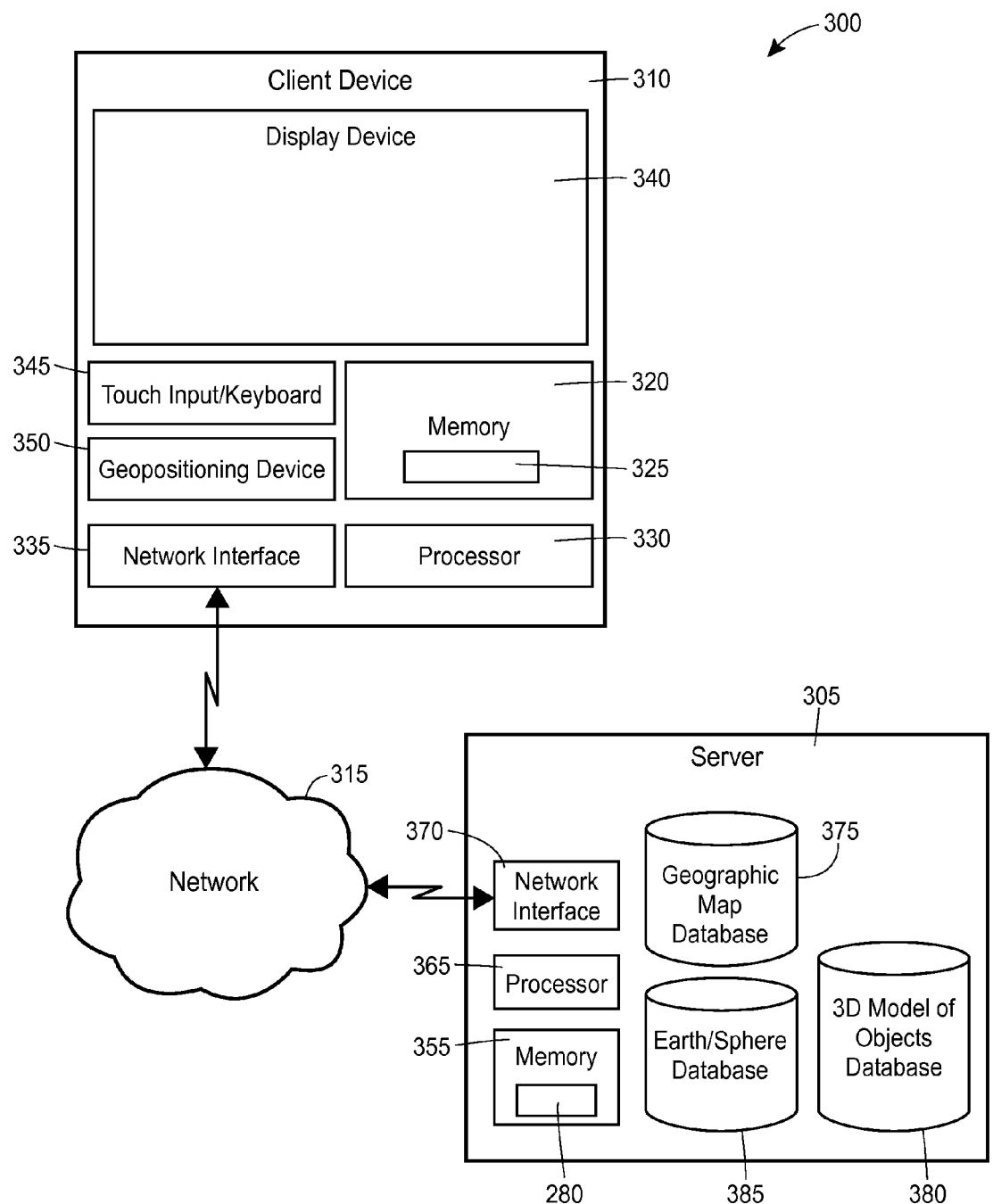
FIG. 3 depicts a high-level block diagram of a computer system for implementing global navigation.

The details associated with a geographic mapping system 300 for navigating around a surface (e.g., surface 125 of FIG. 1) of a 3D, geographic coordinate system, representation of a globe (e.g., the Earth 105) are now described beginning with reference to FIG. 3. FIG. 3 depicts a high-level block diagram of a geographic mapping system 300 that implements communications between client devices 310 and a remote computing device 305 to provide information to a user of the client device 310. A client device 310 is communicatively coupled to the remote computing device 305 via a network 315.

The computing device 305 may include a memory 355 and a processor 365 for storing and executing, respectively, a module 360. The module 360, stored in the memory 355 as a set of computer-readable instructions, facilitates applications related to providing geographic mapping functionality incorporating navigation of a surface of a 3D, geographic coordinate system, representation of the Earth. The module 360 may also facilitate communications between the computing device 305 and the client device 310 via a network interface 370 and the network 315 and other functions and instructions.

The computing device 305 may also include an Earth/sphere database 385 having data representative the Earth and or a sphere representative of the Earth. The computing device 305 may further include a 3D model of objects database 380 having data representative of various objects located on the surface of the Earth, such as buildings, landmarks, natural features, etc. The computing device 305 may also include a geographic map database 375 having data representative of various features located on the surface of the Earth, such as continents, countries, states, counties, cities, roadways, etc. While the Earth/sphere database 385, the 3D model of objects database, 380 and the geographic map database 375 are shown in FIG. 3 as contained within the computing device 305, it should be understood that the Earth/sphere database 385, the 3D model of objects database, 380 and the geographic map database 375 may be located within separate remote servers (or any other suitable computing devices) communicatively coupled to the network 315. Optionally, portions of the Earth/sphere database 385, the 3D model of objects database, 380 and the geographic map database 375 may be stored in memories separate from one another.

For clarity, only one client device 310 is depicted in FIG. 3. While FIG. 3 depicts only one client device 310, it should be understood that any number of client devices 310 may be supported and that each client device 310 may be any appropriate computing device, such as a desk-top computer, a mobile telephone, a personal data assistant, a lap-top computer, a vehicle-based computer system, etc. The client device 310 may include a memory 320 and a processor 330 for storing and executing, respectively, a module 325 that facilitates applications related to providing geographic mapping functionality incorporating navigation of a 3D, geographic coordinate system representation of the Earth. The module 325 may also facilitate communications between the computing device 305 and the client device 310 via a network interface 335 and the network 315 and other functions and instructions. The client device 310 may include a geopositioning device 350, such as a global positioning system receiver or a WiFi positioning device for determining a geographic location of the client device 310. The client device 310 may include a display device 340 which may be any type of electronic display device such as a liquid crystal display (LCD), a light emitting diode (LED) display, a plasma display, a cathode ray tube (CRT) display, or any other type of known or suitable electronic display. The display device 340 may display a map viewport (e.g., the map viewport 100 of FIG. 1, for example) displaying a given geographic area of an overall geographic map at a particular zoom level as specified by a user of the client device 310. The client device 310 may include a user input device 345, such as a touch input/keyboard that provides a mechanism for a user of the client device 310 to enter various information. The user input device 345 may be configured as an integral part of a display device 340, such as a touch screen display device. The network interface 335 may be configured to facilitate communications between the client device 310 and the computing device 305 via any hardwired or wireless communication network (e.g., the network 315), including for example a hardwired Ethernet connection or a wireless LAN, MAN or WAN, WiFi, the Internet, or any combination thereof. Moreover, the client device 310 may be communicatively connected to the computing device 305 via any suitable communication system, such as via any publicly available or privately owned communication network, including those that use wireless communication structures, such as wireless communication networks, including for example, wireless LANs and WANs, satellite and cellular phone communication systems, etc.

Figure 4:
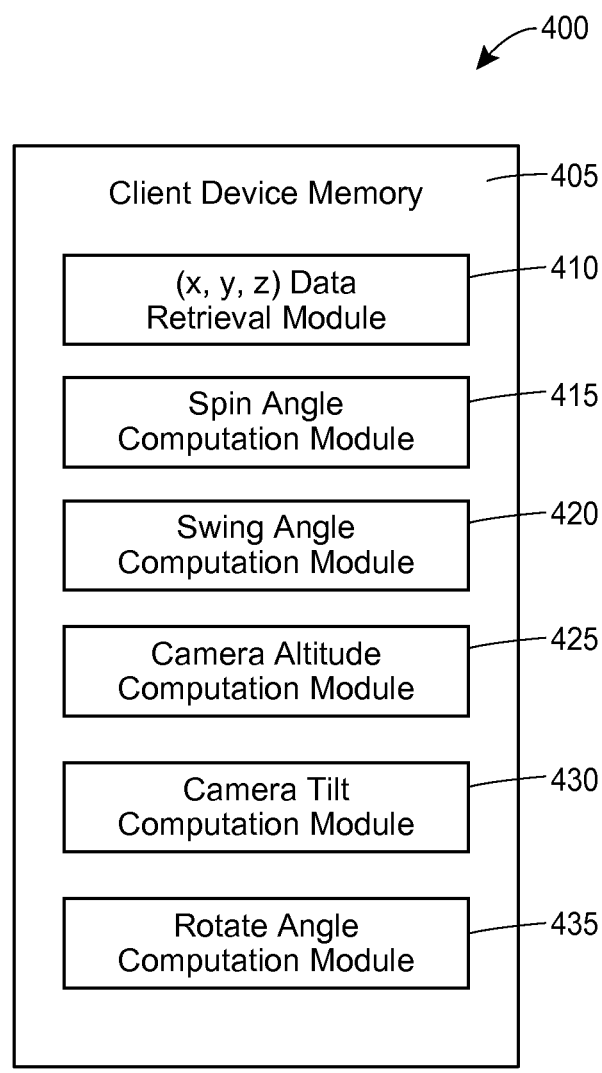
FIG. 4 depicts data structures related to generating a camera view of a globe within a map viewport along with a navigation interface.

Turning now to FIG. 4, a block diagram of a client device 400 is depicted. As described in detail herein, the client device 400 may be suitable for use as a client device 310 of FIG. 3. The client device 310 includes various modules 410, 415, 420, 425, 430 stored on a memory 405. A processor, similar to the processors 330, 365 may execute the modules 410, 415, 420, 425, 430 to navigate around a surface of a 3D, geographic coordinate system, representation of the Earth. Particularly, when a user of a mapping application wants to pan from a first point on the surface of the Earth (e.g., point 130 of FIG. 1) to a second point (e.g., point 135 of FIG. 1), the processor executes at least a portion of the modules 410, 415, 420, 425, 430 in response to the user activating a pan navigation function (e.g., a horizontal pan function 116 and/or a vertical pan function 117 of FIG. 1).

While the modules 410, 415, 420, 425, 430 may be stored on the memory 325 and implemented as a portion of the module 325, it should be understood that the modules 410, 415, 420, 425, 430, or a portion thereof, may be stored on the memory 355 and implemented as at least a portion of the module 360. While modules 410, 415, 420, 425, 430 may be executed by either processor 330, 365, the modules 410, 415, 420, 425, 430 will be described herein as being executed by processor 330.

In any event, the processor 330 may execute an (x, y, z) data retrieval module 410 that accesses an Earth/sphere database (e.g., the database 385) storing data defining a sphere that is representative of the Earth. The processor 330 may also execute a spin angle computation module 415. The spin angle determines the degree to which the sphere will revolve around a spin-axis (e.g., spin-axis 210a of FIG. 2A) in response to a user selecting a horizontal pan feature (e.g., horizontal pan feature 116 of FIG. 1). The processor 330 may further execute a swing angle computation module 420. The swing angle determines the degree to which the sphere will revolve around a swing-axis (e.g., swing-axis 215a of FIG. 2A) in response to a user selecting a horizontal pan feature (e.g., vertical pan feature 117 of FIG. 1). Computation of both the spin and swing angles are discussed in detail herein with regard to FIGS. 7 and 8. The processor 330 may executed both the spin angle computation model 415 and the swing angle computation module 420 (i.e., as a globe surface panning module) in response to a user activating a point-select-and-drag pan feature (i.e., using a mouse).

The processor 330 may execute a camera altitude computation module 425. The processor 330 may execute the camera altitude computation module 425 in conjunction implementation of a panning function, such that a camera altitude is maintained with respect to the surface of the Earth or with respect to objects located on the surface of the Earth. Alternatively, the processor 330 may execute the camera altitude computation module 425 in response to a user selecting a zoom function (e.g., zoom function 114 of FIG. 1). Computation of a camera altitude is described in detail herein with regard to FIG. 9.

The processor 330 may further execute a camera tilt computation module 430 in response to a user selecting a tilt feature (e.g., tilt feature 119 of FIG. 1). The processor 330 may execute the camera tilt computation module 430 in conjunction with executing the spin angle computation module 415 and/or the swing angle computation module 420 such that a camera view point on the surface of the Earth will remain fixed while the camera tilt angle changes. (i.e., the Earth rotates while the camera tilts). Rotating the Earth while tilting the camera results in viewing objects on the surface of the Earth from different perspectives, such as from the top, plan view of the object or a side/top perspective view of the object. Computation of the tilt angle is described in detail herein with regard to FIG. 13.

The processor 330 may also execute a rotate angle computation module 435. The rotate angle determines the degree to which the sphere will revolve around a rotate-axis (e.g. rotate-axis 220a of FIG. 2A) in response to a user selecting a compass rotation feature (e.g., compass rotation feature 113, 118 of FIG. 1).

Figure 5:
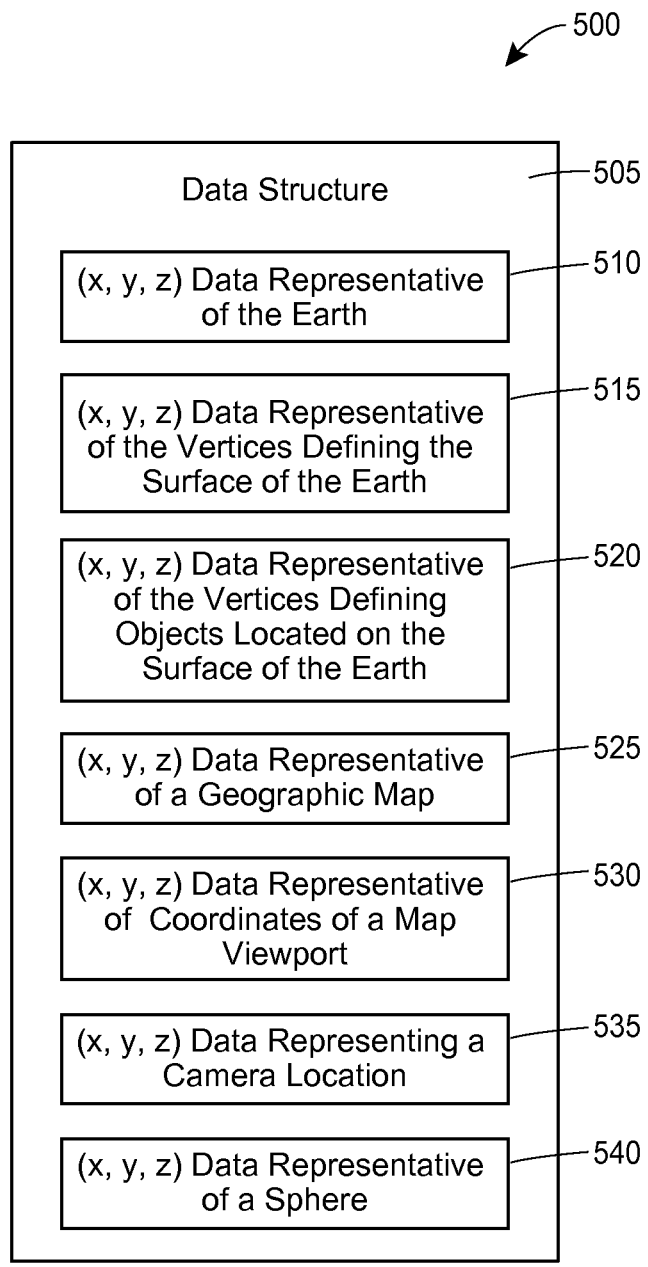
FIG. 5 depicts a block diagram of a computing device including various modules for implementing global navigation.

FIG. 5 depicts a data structure 500 that may be retrieved when the processor 330 executes an (x, y, z) data retrieval module (e.g., (x, y, z) data retrieval module 410 of FIG. 4). The data structure 500 may include (x, y, z) data representative of the Earth 510. The (x, y, z) data representative of the Earth 510 may define a center of mass of the Earth, a North pole of the Earth, a spin-axis of the Earth (e.g., spin axis—210a of FIG. 2A), a swing-axis of the Earth (e.g., swing-axis 215a of FIG. 2A), a rotate-axis of the Earth (e.g., rotate-axis 220a of FIG. 2A), a surface of the Earth and a radius of the Earth.

The data structure 500 may also include (x, y, z) data representative of vertices defining a surface of the Earth 515. The (x, y, z) data representative of vertices defining a surface of the Earth 515 may define the terrain of the land surface of the Earth, an average surface of bodies of water and the underwater terrain of the Earth.

The data structure 500 may further include (x, y, z) data representative of vertices of objects located on the surface of the Earth 520. The (x, y, z) data representative of vertices of objects located on the surface of the Earth 520 may define objects, such as buildings, landmarks, monuments, etc.

The data structure 500 may also include (x, y, z) data representative of a geographic map 525. The (x, y, z) data representative of a geographic map 525 may define roadways, bridges, paths, sidewalks, tunnels, railroads, etc.

The data structure 500 may further include (x, y) data representative of a map viewport 530. The (x, y) data representative of a map viewport 530 may define the relationship between the (x, y, z) data representative of the Earth 510, the (x, y, z) data representative of vertices defining a surface of the Earth 515, the (x, y, z) data representative of vertices of objects located on the surface of the Earth 520 and the (x, y, z) data representative of a geographic map 525 when this data is used to generate a display within a map viewport (e.g., display 100 of FIG. 1).

The data structure 500 may also include (x, y, z) data representative of a camera location 535. The (x, y, z) data representative of a camera location 535 may define a view of a display (e.g., display 100 of FIG. 1). For example, the camera location may define a zoom level and a perspective from which the surface of the Earth and objects located on the surface of the Earth are viewed.

The data structure 500 may further include (x, y, z) data representative of a sphere 540. The (x, y, z) data representative of a sphere 540 may define a geometric relationship between the (x, y, z) data representative of the Earth 510 and the mathematical equations described herein to compute a spin angle and a swing angle, for example. While data structure 500 is described in conjunction with the Earth (e.g., data 510 of FIG. 5), the (x, y, z) data (e.g., data 510 of FIG. 5) may be representative of any 3D object (i.e., body), such as a shoe, a human, a building, a vehicle, etc. In any event, (x, y, z) coordinate data representative of a sphere will be used to compute a corresponding spin angle or swing angle.

Figure 6:
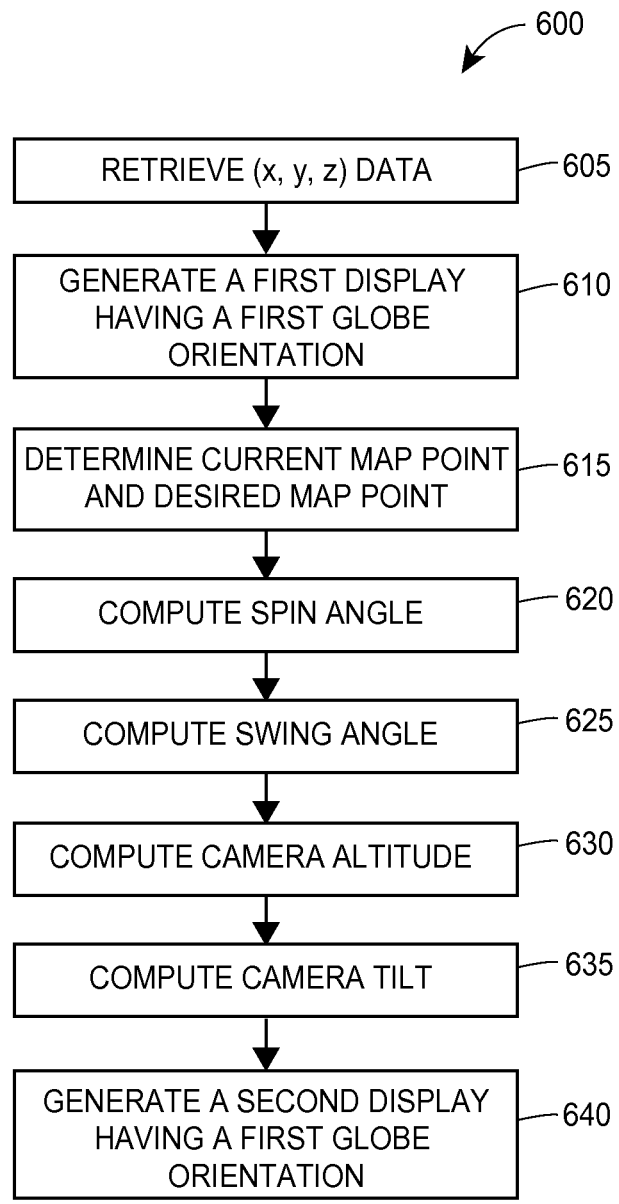
FIG. 6 depicts a flow diagram for a method of generating a camera view of a globe.

With reference now to FIG. 6, a flow diagram depicts a method 600 of navigating around a surface of a 3D, geographic coordinate system, representation of the Earth. The method 600 may be implemented within any suitable computing device, such as either of the client devices 310, 400 of FIG. 3 and FIG. 4, respectively or computing device 305 of FIG. 3. It should be understood that the modules 325, 360 of FIG. 3 or the modules 410, 415, 420, 425, 430 of FIG. 4 may be executed by a processor, similar to processors 330, 365, to implement the method 600. While the modules 410, 415, 420, 425, 430 may be executed by either processor 330, 365 to implement the method 600, execution by the processor 330 will be described herein.

The processor 330, implementing the method 600, retrieves (x, y, z) data (e.g., data structure 500 of FIG. 5) from a database (e.g., Earth/sphere database 385, geographic map database 375 and 3D model of objects database 380 of FIG. 3) (block 605). The processor 330 may generate a display (e.g., display 100 of FIG. 1) based on the retrieved (x, y, z) data (block 610). The processor 330 may determine a current map point (e.g., first point 130 of FIG. 1) on the surface of the globe and a desired map point (e.g., second point 135 of FIG. 1) (block 615) on the surface of the globe in response to a user of a mapping application activating a panning feature of a navigation interface (e.g., horizontal pan feature 116 and, or vertical pan feature 117 of FIG. 1).

The processor 330 may compute a spin angle (block 620) based on the retrieved (x, y, z) data (block 605) and in response to a user of a mapping application activating a panning feature of a navigation interface (e.g., horizontal pan feature 116 and, or vertical pan feature 117 of FIG. 1).

The processor 330 may compute a swing angle (block 625) based on the retrieved (x, y, z) data (block 605) and in response to a user of a mapping application activating a panning feature of a navigation interface (e.g., horizontal pan feature 116 and, or vertical pan feature 117 of FIG. 1).

As an alternative to a user activating a panning function (e.g., horizontal panning feature 116 or vertical panning feature 117 of FIG. 1) of a navigation interface (e.g., navigation interface 115 of FIG. 1), the processor 330 may retrieve the (x, y, z) data (block 605), determine a current map point and a desire map point (block 615), compute a spin angle (block 620) and compute a swing angle (block 625) in response to a user selecting a first point (e.g., first point 130 of FIG. 1) with a user input device (e.g., a mouse) and dragging the first point to a second point (e.g., second point 135 of FIG. 1). In either event, the processor 330 may generate a second display (block 640) reflecting the fact that the globe has been moved from the first point 130 to the second point 135.

The processor 330 may compute a camera altitude (block 630) based on the retrieved (x, y, z) data (block 605). The processor 330 may compute a camera altitude (block 630) in response to a user activating a pan feature (e.g., horizontal pan feature 116 and, or vertical pan feature 117 of FIG. 1 or "point drag" using a mouse) or in response to a user activating a zoom feature (e.g., zoom feature 114 of FIG. 1). The processor 330 may generate a second display (block 640) reflecting the fact that a camera altitude has been computed.

The processor 330 may compute a camera tilt angle (block 635) in response to a user activating a tilt feature (e.g., tilt feature 119 of FIG. 1). The processor 330 may compute the camera tilt (block 635) in conjunction with computing the spin angle (block 620) and, or computing the swing angle (block 625) such that a camera view point on the surface of the Earth will remain fixed while the camera tilt angle changes. (i.e., the Earth rotates while the camera tilts). Rotating the Earth while tilting the camera results in viewing objects on the surface of the Earth from different perspectives, such as from the top, plan view of the object or a side/top perspective view of the object. Computation of the tilt angle is described in detail herein with regard to FIG. 9. The processor 330 may generate a second display (block 640) reflecting the fact that a camera tilt angle has been computed.

Figure 7:
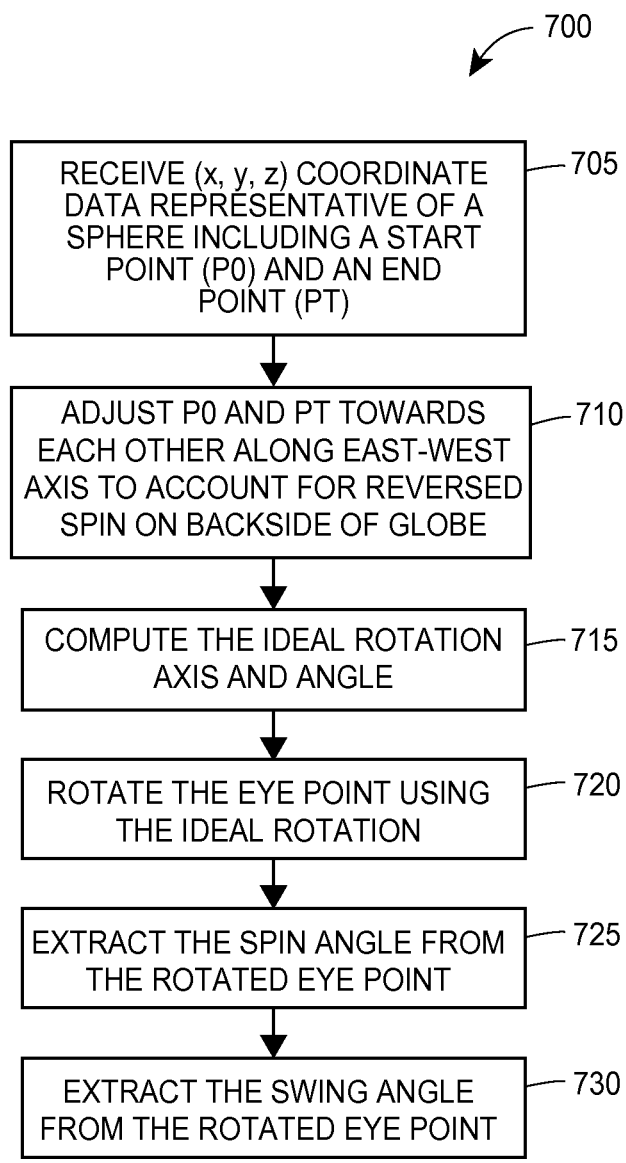
FIG. 7 depicts a flow diagram for a method of calculating a spin angle for revolving a sphere around a spin-axis and calculating a swing angle for revolving a sphere around a swing-axis.

Turning now to FIG. 7, a flow diagram depicts a method 700 of computing a spin angle 211a and a swing angle 216a. The method 700 may be implemented within any suitable computing device, such as either of the client devices 310, 400 of FIG. 3 and FIG. 4, respectively or computing device 305 of FIG. 3. It should be understood that the modules 325, 360 of FIG. 3 or the modules 415, 420 of FIG. 4 may be executed by a processor, similar to processors 330, 365, to implement the method 700. While the modules 415, 420 may be executed by either processor 330, 365 to implement the method 700, execution by the processor 330 will be described herein. The method 700 of computing a spin angle and a swing angle will be described in conjunction with FIGS. 2A-2B where appropriate.

A user of a mapping application may activate a pan function (e.g., horizontal pan feature 116 or vertical pan feature 117 of FIG. 1) to reposition the globe from the starting point $\vec{p}_0$ 130 to the second point $\vec{p}_i$ 135. In accordance with the above spin angle and swing angle computations, the sphere 200a may be revolved around the spin-axis 210a and the swing-axis 215a such that the sphere 200a is moved from the first point 130 to the ending point 135. Alternatively, the sphere 200a may be moved from the beginning point 130 to the ending point 135 by revolving the sphere 200a around the swing-axis 215a first and subsequently revolved around the spin-axis 210a.

The processor 330 may receive (x, y, z) coordinate data representative of a sphere 540 including a start point 130 and an ending point 135 (block 705). The processor 330 may execute several equations to adjust the starting point 130 and the ending point 135 towards each other along an East-West axis 108-109 to account for reversed spin on a backside of the sphere 232b (block 710). For example, the processor 330 may compute the east axis as a cross product between the axes (vectors) n̂ and ô by the following equation:

$$\hat{e} = \hat{n} \times \hat{o} \qquad \text{Equation 1}$$

The processor 330 may compute a normal of a plane 240b of FIG. 2B that passes through n̂ and ê axes as a cross product of those axes using the following equation:

$$\hat{y} = \hat{e} \times \hat{n} \qquad \text{Equation 2}$$

The processor 330 may compute a distance from the starting point 130 to the plane 240b as if the starting point 130 were on a unit circle that is perpendicular to the ii, axis using the following equation:

$$d = \vec{p_0} \cdot \hat{y} \qquad \text{Equation 3}$$

The processor 330 may normalize the distance to the range [−1,1]:

$$d_n = \frac{d}{\|\vec{p_0}\|} \qquad \text{Equation 3}$$

In order to reverse rotation around the North axis 210b to account for a starting point 130 being in an opposite hemisphere 230b, 231b from an ending point 135, the processor 330 may move the starting point 130 and the ending point 135 towards each other using the following equations:

$$d_n = 1 : \vec{p_0} \text{ and } \vec{p_t}) \text{ stay the same,} \qquad \text{Equation 5}$$

$$d_n = 0 : \vec{p_0} \text{ and } \vec{p_t}) \text{ are moved toward each other such that they are the same in the East-West component,} \qquad \text{Equation 6}$$

$$d_n = -1 : \vec{p_0} \text{ and } \vec{p_t} \text{ completely swap their East-West component.} \qquad \text{Equation 7}$$

$$m = \frac{1}{2}(-d_n + 1) \qquad \text{Equation 8}$$

$$v = m\hat{x}((\vec{p_0} - \vec{p_t}) \cdot \hat{x}) \qquad \text{Equation 9}$$

$$\vec{p'_0} = \text{the adjusted starting point} = \vec{p_0} - v \qquad \text{Equation 10}$$

$$\vec{p'_t} = \text{the adjusted ending point} = \vec{p_t} + v \qquad \text{Equation 11}$$

The processor 330 may compute an ideal rotation axis (r̂) and angle (θ) based on the adjusted starting point and adjusted ending point (block 715). The processor 330 may compute the ideal rotation axis (r̂) and angle (θ) using the following equations:

$$\vec{a} = \vec{p_0'} \times \vec{p_t'} \qquad \text{Equation 12}$$

$$\hat{r} = \frac{\vec{a}}{\|\vec{a}\|} \qquad \text{Equation 13}$$

$$\theta = \sin^{-1}\left(\frac{\vec{a}}{\|\vec{p_0'}\|\|\vec{p_t'}\|}\right) \qquad \text{Equation 14}$$

The processor 330 may rotate the camera viewpoint 225b around the ideal rotation axis (r̂) equal to the ideal rotation angle (θ) (block 720) using, for example, the following equations:

$$M = \text{axisAngleToMatrix}(\hat{r}, \theta) \qquad \text{Equation 15}$$

$$\hat{o}' = \text{the rotated eye point} = M\hat{o}$$

The processor 330 may extract a spin angle from the rotated camera viewpoint (block 725) using, for example, the following equation:

$$\theta_s = \text{the spin angle} = \tan^{-1}\left(\frac{\hat{o}'_y}{\hat{o}'_x}\right) \qquad \text{Equation 17}$$

The processor 330 may extract a swing angle from the rotated camera viewpoint (ô') (block 730) using, for example, the following equation:

$$\theta_w = \text{the swing angle} = \tan^{-1}\left(\frac{\hat{o}'_z}{\sqrt{\hat{o}'_x \hat{o}'_x + \hat{o}'_y \hat{o}'_y}}\right) \qquad \text{Equation 18}$$

Figure 8:
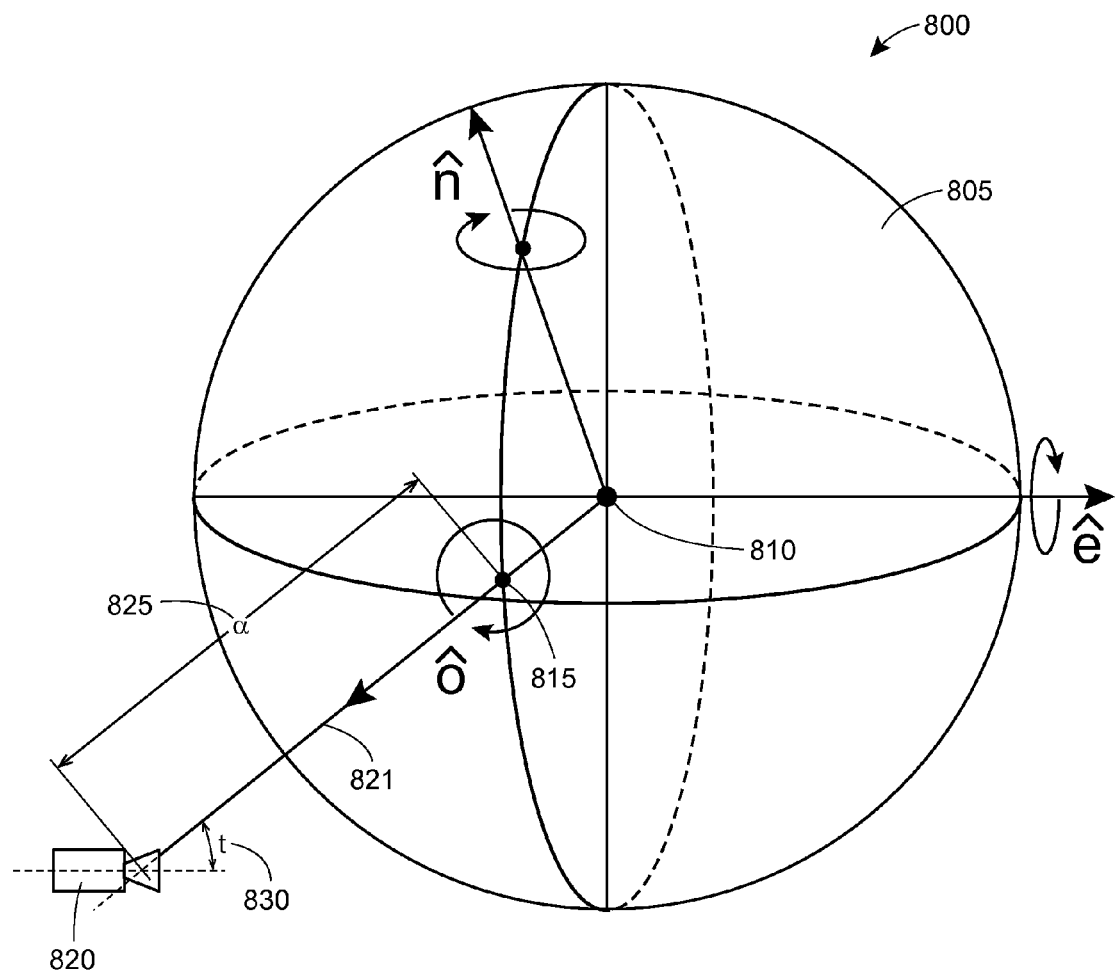
FIG. 8 depicts an example of determining a camera altitude and a first example of determining a camera tilt angle.

Turning to FIG. 8, a camera 820 altitude 825 is maintained relative to terrain 815 associated with the surface 805 of the Earth 800 while a user navigates around the surface 805. A processor (e.g., processor 330 of FIG. 3) may execute a camera altitude computation module (e.g., camera altitude computation module 425 of FIG. 4) to determine the camera 820 altitude 825. The process 330 may determine the camera 820 altitude 825 without reference to buildings, landmarks and other objects located on the surface 805 of the Earth 800. When the processor 330 determines the camera 820 altitude 825 without reference to buildings, landmarks and other objects located on the surface 805 of the Earth 800, navigation may be limited to values greater than or equal to certain values that form a minimum isosurface to define a "safety envelope". Thereby, "collision" between the camera 820 and any object that is located on the surface 805 is avoided. Alternatively, the processor 330 may determine a camera 820 altitude 825 with reference to buildings, landmarks and other objects located on the surface 805 of the Earth 800. The camera altitude computation module 425 may implement a function that smoothly maintains the camera 820 altitude 825 following the terrain 815 by defining the surface 805 of the Earth 800 as a cubic higher-order surface (e.g., Bezier, Hermite or Catmull-Clark) relative to discrete regular samples. The camera altitude computation module 425 may be based on a spacing of altitude samples that represent a multi-resolution scheme where the distance between one sample and the next is about 128 pixels. When a new geometry level of detail for a geographic map (e.g., data 510, 515, 520 of FIG. 5) is displayed, the processor 330 may not change the camera 820 altitude 825. Rather, the camera 820 altitude 825 may travel relative to a new isosurface that passes through the camera 820. A camera 820 viewing axis 921 may be aligned generally perpendicular relative to a smoothly varying surface within a field of view of the camera 820. Panning around the geographic map may equate to navigation along the isosurface associated with a camera 820 field of view. As new map data (e.g., data 510, 515, 520 of FIG. 5) comes in for camera 820 altitude 825 samples, the distance field described above may change. When the camera 820 altitude 825 is not in conflict with a lower bound (i.e., an altitude associated with a tallest object that is projecting from the surface 805), the processor 330 may keep the camera 820 altitude 825 unchanged. When the camera 820 altitude 825 is in conflict with a lower bound, the processor 330 may gradually add a delta to the camera 820 altitude 825 delta such that the camera 820 altitude 825 change is not perceivable to a user. The processor 330 may implement camera 820 collision avoidance to account for buildings, landmarks and other objects located on the surface 805 of the Earth 800. The processor 330 may achieve camera 820 collision avoidance with respect to any objects projecting from the surface 805 or the terrain associated with the surface 805 by periodically sampling heights of objects currently displayed within a map viewport while a user navigates around a geographic map associated with the surface 805 of the Earth 825.

Figure 9:
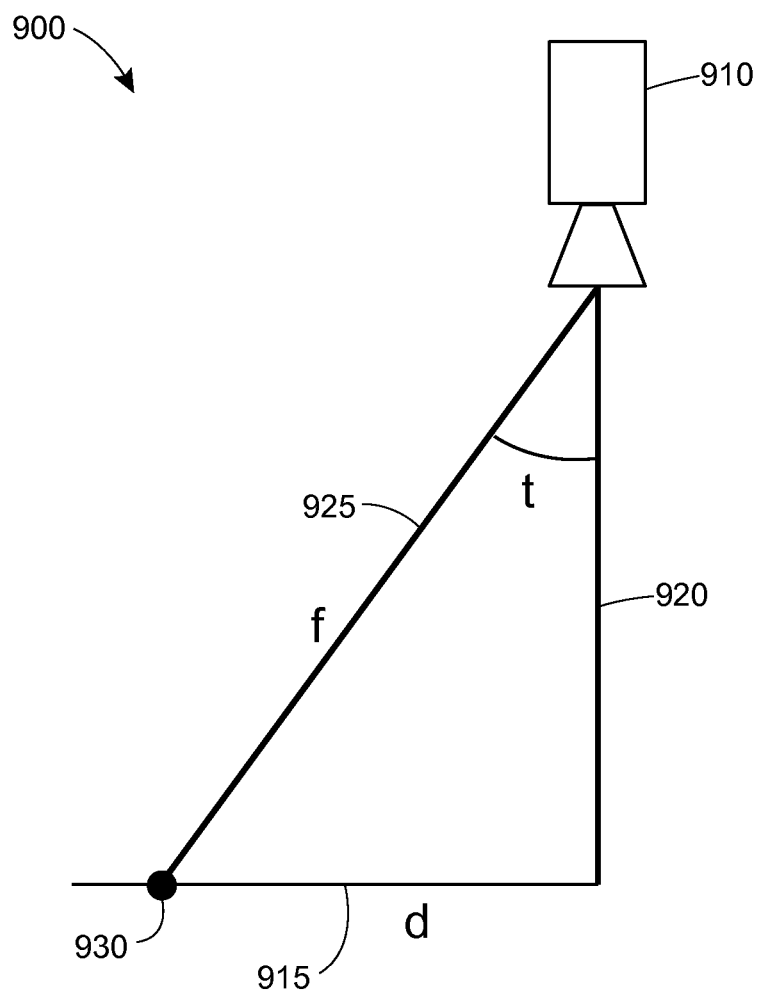
FIG. 9 depicts a second example of determining a camera tilt angle.

With further reference to FIG. 8 and with additional reference to FIG. 9, the relationship between a camera 820, 910 tilt angle t (830, 905), the altitude a (825, 920), and the distance 915 to the target point d (930) is defined. A processor (e.g., processor 330 of FIG. 3) may execute a camera tilt angle computation module (e.g., camera tilt computation module 430 of FIG. 4) to determine a camera 820, 910 tilt angle 830, 905. It is desirable to avoid giving a user the perception of moving the camera 820, 910 further away from the target point 930 as the altitude 825, 920 is changed (i.e., it is desirable to have f (925) decrease as a (925, 920) decreases):

$$f = a / \cos(t) \qquad \text{Equation 19}$$

The camera tilt angle computation module 430 may implement a linear function to compute a tilt angle 830, 905 based on the altitude 825, 920 when the maximum tilt angle 830, 905 is 45 degrees or less. However, when the camera 820, 910 tilt angle 830, 905 is greater than 45 degrees, the camera 820, 910 does not appear to move closer to the target point during some of the zoom animation using a linear function. In other words, the camera 820, 910 altitude 825, 920 does not decrease fast enough when using a linear function while the camera 820, 910 tilt angle 830, 905 is greater than 45 degrees. As an alternative to providing auto-tilt behavior for the camera 820, 910 by directly defining a tilt angle 830, 905 for specific altitude 825, 920, the processor 330 may define a camera 820, 910 altitude 825, 920 relative to the target point 930 and compute the tilt angle 830, 905 based on the camera 820, 910 altitude 825, 920. Mathematical conditions to ensure that the camera 820, 910 is getting closer to the target point 930 are defined with reference to equation 16 (i.e., f decreases when a decreases and vice-versa):

$$df/da = (1 + a\tan(t)dt/da)/\cos(t) \qquad \text{Equation 20}$$

Where:

$df/da > 0$, $df/da = (1 + a\tan(t)dt/da)/\cos(t) > 0$ $1 + a\tan(t)dt/da > 0$ $$dt/da > -1/(a\tan(t)) \qquad \text{Equation 21}$$

Where:

$\tan(t) > 0$, for $0 > t > 90$ and $a > 0$)

$dt/da < 0$, to make sure that $t$ increases as $a$ decreases

As a user of a mapping application navigates around the surface (e.g., surface 125 of FIG. 1) of a globe (e.g., Earth 105 of FIG. 1) that is represented by a sphere (e.g. sphere 200a of FIG. 2A), a processor (e.g., processor 330) may transform the vertices that define the surface 125 of the globe 105 and objects located on the surface 125 by mathematically manipulating the following sequence of matrices to produce a total vertex transformation (M):

$$M = R_t T_a R_c R_w R_s \qquad \text{Equation 22}$$

Where:
  $R_c$ is a compass rotation matrix,
  $R_s$ is a spin rotation matrix,
  $R_w$ is a swing rotation matrix,
  $T_a$ is an altitude translation matrix, and
  $R_t$ is a tilt rotation matrix.

When the vertices that define the surface 125 of the globe 105 and the objects located on the surface 125 are transformed using the matrices defined above, each vertex is repositioned in accordance with the spin angle, the swing angle and the rotate angle computed above. The compass rotation matrix ($R_c$), the swing rotation matrix ($R_w$) and the spin rotation matrix ($R_s$) are sufficient for describing all possible orientations of the globe 105, therefore, these three matrices define a globe rotations matrix (G):

$$G = R_c R_w R_s \qquad \text{Equation 23}$$

All compass rotations are restricted to the compass rotation matrix $R_c$, which means that the swing rotation matrix ($R_w$) and the spin rotation matrix ($R_s$) are sufficient for describing all orientations of the globe 105 that are possible without changing the compass directions. The other transformations taken together define a camera transformations matrix (C):

$$C = R_t T_a \qquad \text{Equation 24}$$

and the total vertex transformation matrix is:

$$M = C\, G \qquad \text{Equation 25}$$

Given a function R(â, x) which creates a rotation of angle x around an axis â, and a function T(v̂) which creates a translation of vector v̂, and using the coordinate system used in FIG. 2A, a processor (e.g. processor 330) may compute the globe rotations matrix G by:

$$G = R([0,0,1], c) R([1,0,0], w) R([0,1,0], s), \qquad \text{Equation 26}$$

and may compute the camera transformation matrix C by:

$$C = R([1,0,0]), -t) T([0,0,-a]) \qquad \text{Equation 27}$$

Where:
  c, w, and s are the rotate, swing, and spin angles, and t and a are the tilt angle and altitude respectively.

As described in detail herein, rotation of a globe due to activation of a pan feature of a navigation interface may be independent of rotation of the globe due to activation of a rotate feature. As a result, a user of a mapping application may navigate between a first point on a surface of the globe to a second point on the surface of the globe by activating a pan feature while a North-South orientation of the globe remains fixed. Activation of the pan feature does not reorient the North-South orientation of the globe. The user may reorient the North-South orientation of the globe by activating a rotate feature.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system and a method for navigating a surface of a 3D object with North locked for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a method for navigating a surface of a 3D object with North locked. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of presenting a camera viewpoint of a three-dimensional surface of a body within a two-dimensional viewport that is rendered on a computing device, the body surface is defined by data of a three-dimensional coordinate system having x, y, and z axes, wherein the body includes a North pole and a South pole, a spin-axis that extends through a center of the body generally along the z-axis, a swing-axis that extends generally along the x-axis through the center of the body perpendicular to the spin-axis and parallel to a plane defined by the map viewport, and a rotate-axis that extends generally along the y-axis through the center of the body perpendicular to the plane, the method comprising:
rendering a display of the body in the viewport using the three-dimensional coordinate system data;
presenting within the viewport an interactive compass heading feature that specifies a direction of the North pole;
changing a current orientation of the North pole to a new orientation in response to a user operating the compass heading feature;
causing the rendered body to move within the viewport between a current point ($\vec{p_0}$) on the body surface and a desired map point ($\vec{p_t}$) on the body surface using the three-dimensional coordinate system data by:
determining a spin-axis angle of revolution around the spin-axis and a swing-axis angle of revolution around the swing-axis, between the current point and the desired point,
moving the rendered body within the viewport along the determined spin-axis angle of revolution and the determined swing-axis angle of revolution, and
restricting rotation along the rotate axis so that movement of the body within the viewport between the current point and the desired point does not change the new orientation of the North pole of the rendered body within the viewport.

2. The method of claim 1, wherein an angle of revolution around the spin-axis is defined by:

$$\theta_s = \text{the spin angle} = \tan^{-1}\left(\frac{\hat{o}'_y}{\hat{o}'_x}\right).$$

3. The method of claim 2, wherein an angle of revolution around the swing-axis is defined by:

$$\theta_w = \text{the swing angle} = \tan^{-1}\left(\frac{\hat{o}'_z}{\sqrt{\hat{o}'_x \hat{o}'_x + \hat{o}'_y \hat{o}'_y}}\right).$$

4. The method of claim 1, wherein an angle of revolution around the swing-axis is defined by:

$$\theta_w = \text{the swing angle} = \tan^{-1}\left(\frac{\hat{o}'_z}{\sqrt{\hat{o}'_x \hat{o}'_x + \hat{o}'_y \hat{o}'_y}}\right).$$

5. The method of claim 1 further comprising determining a camera tilt angle with respect to a point on the surface of the body according to the equations:

$df/da=(1+a\tan(t)dt/da)/\cos(t)$

Where:

$df/da>0$, $df/da=(1+a\tan(t)dt/da)/\cos(t)>0$ $1+a\tan(t)dt/da>0$ $dt/da>-1/(a\tan(t))$ Where:

$\tan(t) > 0$, for $0 > t > 90$ and $a > 0$)

$dt/da < 0$, to make sure that $t$ increases as $a$ decreases.

6. The method of claim 1 further comprising determining a camera altitude with respect to a point on the surface of the body according to the equation $f = a/\cos(t)$.

7. The method of claim 1, wherein the body is a globe representing the Earth.

8. A computing device having a display configured to present a camera viewpoint of a three-dimensional surface of a body within a two-dimensional viewport that is rendered on a computing device, the body surface is defined by data of a three-dimensional coordinate system having x, y, and z axes, wherein the body includes a North pole and a South pole, a spin-axis that extends through a center of the body generally along the z-axis, a swing-axis that extends generally along the x-axis through the center of the body perpendicular to the spin-axis and parallel to a plane defined by the viewport, and a rotate-axis that extends along the y-axis through the center of the body perpendicular to the plane, the computing device comprising:
   a cursor control device having a user input mechanism, wherein activation of the cursor control device and the input mechanism causes a processor to execute a body surface panning module;
   a display generation module stored on a non-transitory computer readable medium that, when executed by a processor, (i) renders a display of the body in the viewport using the three-dimensional coordinate system data, (ii) presents within the viewport an interactive compass heading feature that specifies a direction of the North pole, and (iii) changes a current orientation of the North pole to a new orientation in response to a user operating the compass heading feature;
   the body surface panning module stored on a non-transitory computer readable medium that, when executed by a processor, causes the rendered body to move within the viewport between a current point $(\vec{p_0})$ on the body surface and a desired point $(\vec{p_t})$ on the body surface using the three-dimensional coordinate system data by:
      determining a spin-axis angle of revolution around the spin-axis and a swing-axis angle of revolution around the swing-axis between the current point and the desired point,
      moving the rendered body within the viewport along the determined spin-axis angle of revolution and the determined swing-axis angle of revolution, and
      restricting rotation along the rotate axis so that movement of the body within the viewport between the current point and the desired point does not change the new orientation of the North pole of the rendered body within the viewport.

9. The method of claim 8, wherein an angle of revolution around the swing-axis is defined by:

$$\theta_w = \text{the swing angle} = \tan^{-1}\left(\frac{\hat{o}'_z}{\sqrt{\hat{o}'_x \hat{o}'_x + \hat{o}'_y \hat{o}'_y}}\right).$$

10. The method of claim 9, wherein an angle of revolution around the spin-axis is defined by:

$$\theta_s = \text{the spin angle} = \tan^{-1}\left(\frac{\hat{o}'_y}{\hat{o}'_x}\right).$$

11. The method of claim 8, wherein an angle of revolution around the spin-axis is defined by:

$$\theta_s = \text{the spin angle} = \tan^{-1}\left(\frac{\hat{o}'_y}{\hat{o}'_x}\right).$$

12. The computing device of claim 8, further comprising an altitude computation module stored on a non-transitory computer readable medium that, when executed by a processor, calculates a camera altitude according to the equations:

$df/da = (1 + a \tan(t) dt/da)/\cos(t)$

Where:

$df/da > 0$, $df/da = (1 + a \tan(t) dt/da)/\cos(t) > 0$ $1 + a \tan(t) dt/da > 0$ $dt/da > -1/(a \tan(t))$ Where:

$\tan(t) > 0$, for $0 > t > 90$ and $a > 0$)

$dt/da < 0$, to make sure that $t$ increases as $a$ decreases.

13. The computing device of claim 8, further comprising a camera tilt angle computation module stored on a non-transitory computer readable medium that, when executed by a processor, calculates a camera tilt angle according to the equation $f = a/\cos(t)$.

14. A non-transitory computer-readable medium having instructions stored thereon that are configured to present a camera viewpoint of a three-dimensional surface of a body within a two-dimensional viewport that is rendered on a computing device, the body surface including data of a three-dimensional coordinate system having x, y, and z axes, wherein the body includes a North pole and a South pole, a spin-axis that extends through a center of the body along the z-axis between the North pole and the South pole, a swing-axis that extends along the x-axis through the center of the body perpendicular to the spin-axis and parallel to a plane defined by the viewport, and a rotate-axis that extends along the y-axis through the center of the body perpendicular to the plane, the non-transitory computer-readable medium comprising:
   a display generation module that, when executed by a processor, (i) renders a display of the body in the viewport using the three-dimensional coordinate system data, (ii) presents within the viewport an interactive compass heading feature that specifies a direction of the North pole, and (iii) changes a current orientation of the North pole to a new orientation in response to a user operating the compass heading feature;
   a body surface panning feature module that, when executed by a processor, causes the rendered body to move within the viewport between a current point $(\vec{p_0})$ on the body surface and a desired point $(\vec{p_t})$ on the body surface using the three-dimensional coordinate system data by:

determining a spin-axis angle of revolution around the spin-axis and a swing-axis angle of revolution around the swing-axis between the current point and the desired point, moving the rendered body within the viewport along the determined spin-axis angle of revolution and the determined swing-axis angle of revolution, and restricting rotation along the rotate axis so that movement of the body within the viewport between the current point and the desired point does not change the new orientation of the North pole of the rendered body within the viewport.

15. The method of claim 14, wherein an angle of revolution around the spin-axis is defined by:

$$\theta_s = \text{the spin angle} = \tan^{-1}\left(\frac{\hat{o}'_y}{\hat{o}'_x}\right).$$

16. The method of claim 15, wherein an angle of revolution around the swing-axis is defined by:

$$\theta_w = \text{the swing angle} = \tan^{-1}\left(\frac{\hat{o}'_z}{\sqrt{\hat{o}'_x \hat{o}'_x + \hat{o}'_y \hat{o}'_y}}\right).$$

17. The method of claim 14, wherein an angle of revolution around the swing-axis is defined by:

$$\theta_w = \text{the swing angle} = \tan^{-1}\left(\frac{\hat{o}'_z}{\sqrt{\hat{o}'_x \hat{o}'_x + \hat{o}'_y \hat{o}'_y}}\right).$$

18. The non-transitory computer-readable medium of claim 14, further comprising a camera altitude computation module that, when executed on a processor, calculates a camera altitude according to the equations:

$df/da = (1 + a \tan(t) dt/da)/\cos(t)$

Where:

$df/da > 0$, $df/da = (1 + a \tan(t) dt/da)/\cos(t) > 0$ $1 + a \tan(t) dt/da > 0$ $dt/da > -1/(a \tan(t))$ Where:

$\tan(t) > 0$, for $0 > t > 90$ and $a > 0$)

$dt/da < 0$, to make sure that $t$ increases as $a$ decreases; and a tilt angle computation module that, when executed on a processor, calculates a tilt angle according to the equation $f = a/\cos(t)$.

* * * * *